(12) United States Patent
Matula et al.

(10) Patent No.: US 7,067,004 B2
(45) Date of Patent: Jun. 27, 2006

(54) GROUT COMPOSITIONS HAVING HIGH THERMAL CONDUCTIVITIES AND METHODS OF USING THE SAME

(75) Inventors: Gary W. Matula, Houston, TX (US); Toby N. McClain, Kingwood, TX (US); Paul K. Chaney, Kingwood, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/767,690

(22) Filed: Jan. 29, 2004

(65) Prior Publication Data

US 2005/0166802 A1 Aug. 4, 2005

(51) Int. Cl.
| | |
|---|---|
| C04B 14/06 | (2006.01) |
| C04B 14/10 | (2006.01) |
| C04B 24/20 | (2006.01) |
| C04B 7/12 | (2006.01) |
| E23B 33/14 | (2006.01) |

(52) U.S. Cl. .............. 106/803; 106/805; 106/806; 106/809; 106/812; 106/DIG. 4; 507/100; 507/103; 507/106; 507/107; 507/108; 507/119; 507/128; 507/142; 507/143; 252/70; 166/293; 166/302; 405/266; 405/267

(58) Field of Classification Search .......... 106/803, 106/805, 806, 809, 812, DIG. 4; 507/100, 507/103, 106, 107, 108, 119, 128, 142, 143; 166/293, 302; 405/266, 267; 252/70
See application file for complete search history.

(56) References Cited

U.S. PATENT DOCUMENTS

| | | | | |
|---|---|---|---|---|
| 4,050,950 | A | 9/1977 | Brewer et al. | |
| 4,177,078 | A | 12/1979 | Welna et al. | |
| 4,291,008 | A | 9/1981 | Hsu et al. | ........ 423/461 |
| 4,361,661 | A | 11/1982 | Jackson | |
| 4,696,698 | A | 9/1987 | Harriett | |
| 4,696,699 | A | 9/1987 | Harriett | |
| 4,797,158 | A | 1/1989 | Harriett | |
| 4,886,550 | A | 12/1989 | Alexander | |
| 4,948,428 | A | 8/1990 | Liao | ............ 106/628 |
| 5,389,146 | A | 2/1995 | Liao | ............ 106/811 |
| 5,826,669 | A | 10/1998 | Zaleski | |
| 6,105,674 | A | 8/2000 | Liao et al. | |
| 6,152,227 | A | 11/2000 | Lawson et al. | |
| 6,251,179 | B1 | 6/2001 | Allan | ............ 106/719 |
| 6,258,160 | B1 | 7/2001 | Chatterji et al. | ............ 106/705 |
| 6,395,199 | B1 | 5/2002 | Krassowski et al. | |
| 6,502,636 | B1 | 1/2003 | Chatterji et al. | ............ 166/293 |
| 6,644,891 | B1 | 11/2003 | Caslini et al. | |
| 2002/0056404 | A1 | 5/2002 | Chatterji et al. | |
| 2003/0188666 | A1 | 10/2003 | Johnson, Jr. et al. | ........ 106/638 |

FOREIGN PATENT DOCUMENTS

| | | |
|---|---|---|
| EP | 1 065 451 A2 | 1/2001 |
| WO | WO 95/14643 | 6/1995 |

OTHER PUBLICATIONS

Paper entitled "Thermally Conductive Cementitious Grouts For Geothermal Heat Pumps" by Brookhaven National Laboratory, undated but admitted to be prior art.
Foreign communication from a related counterpart application dated Jun. 17, 2005.

*Primary Examiner*—Elizabeth D. Wood
(74) *Attorney, Agent, or Firm*—Craig W. Roddy; Conley Rose, P.C.

(57) ABSTRACT

Grout slurries are provided that have high thermal conductivities of greater than about 1.4 Btu/hr-ft-° F. and low hydraulic conductivities ranging from about $5 \times 10^{-9}$ cm/s to about $1 \times 10^{-8}$ cm/s. Such grout slurries comprise water and a grout composition that is available as a one-sack product. The grout composition includes calcium bentonite present in an amount of from about 15% to about 45%, sodium bentonite present in an amount of from about 15% to about 45%, silica flour present in an amount of from about 10% to about 35%, and flaked graphite present in an amount of from about 10% to about 75%, all by weight of the grout composition. Further, methods of installing a conduit such as a heat transfer loop in a hole in the earth include placing the conduit in the hole, forming the foregoing grout slurry, and placing the grout slurry in the hole adjacent to the conduit.

43 Claims, No Drawings

GROUT COMPOSITIONS HAVING HIGH THERMAL CONDUCTIVITIES AND METHODS OF USING THE SAME

FIELD OF THE INVENTION

This invention generally relates to thermally conductive grout compositions. More specifically, the invention relates to grout compositions having relatively high thermal conductivities and low hydraulic conductivities and methods of using the same to install a heat transfer loop in the earth.

BACKGROUND OF THE INVENTION

Heat transfer loops are often placed in the earth to provide for the heating and cooling of residential and commercial spaces. Since ground temperatures are generally similar to room temperatures in buildings, the use of such heat transfer loops can be cost effective alternatives to conventional heating and cooling systems. The installation of such heat transfer loops involves inserting a continuous loop of pipe connected to a heat pump unit into a hole or series of holes in the earth to act as a heat exchanger. A thermally conductive grout is then placed in the hole between the pipe wall and the earth. A heat transfer fluid can be circulated through the underground heat transfer loop to allow heat to be transferred between the earth and the fluid via conduction through the grout and the pipe wall. When the system is operating in a heating mode, a relatively cool heat transfer fluid is circulated through the heat transfer loop to allow heat to be transferred from the warmer earth into the fluid. Similarly, when the system is operating in a cooling mode, a relatively warm heat transfer fluid is circulated through the heat transfer loop to allow heat to be transferred from the fluid to the cooler earth. Thus, the earth can serve as both a heat supplier and a heat sink.

The efficiency of the heat transfer loop is affected by the grout employed to provide a heat exchange pathway and a seal from the surface of the earth down through the hole. The grout needs to have a relatively high thermal conductivity to ensure that heat is readily transferred between the heat transfer fluid and the earth. Further, the grout must form a seal that is substantially impermeable to fluids that could leak into and contaminate ground water penetrated by the hole in which it resides. The hydraulic conductivity, which measures the rate of movement of fluid (i.e., distance/time) through the grout, is thus desirably low. Moreover, the grout needs to have a relatively low viscosity to allow for its placement in the space between the heat transfer loop and the earth without leaving voids that could reduce the heat transfer through the grout. In an attempt to achieve such properties, two types of grouts containing sand to enhance their thermal conductivity, i.e., bentonite-based grout and cement-based grout, have been developed that are extremely labor intensive to prepare. In particular, conventional grouts often require several hundred pounds of sand to render them suitably thermally conductive. Unfortunately, the thermal conductivity that may be achieved by these conventional grouts is limited by the amount of sand that can be incorporated into and properly suspended in the grout. Also, the preparation of such grouts is inflexible in that the concentrations of the components and the mixing procedures must be precise to avoid problems in the field. Further, cement-based grout has the limitation of being very expensive.

A need therefore exists for an improved grout for use in sealing a heat transfer loop to the earth. It is desirable for the grout to have a higher thermal conductivity and a lower hydraulic conductivity than conventional grouts while at the same time being relatively easy and inexpensive to prepare. It is also desirable for the grout to have some flexibility in the way it can be prepared.

SUMMARY OF THE INVENTION

In an embodiment, grout slurries have high thermal conductivities of greater than about 1.4 Btu/hr-ft-° F. They also have low hydraulic conductivities in the range of from about $5 \times 10^{-9}$ cm/s to about $1 \times 10^{-8}$ cm/s. Such grout slurries comprise water such as fresh water and a grout composition that is available as a one-sack product. The amount of the grout composition present in a grout slurry may range from about 35% to about 45% by weight of the grout slurry. The grout composition includes calcium bentonite present in an amount of from about 15% to about 45%, sodium bentonite present in an amount of from about 15% to about 45%, a silica material such as silica flour present in an amount of from about 10% to about 35%, and a carbon; source such as flaked graphite present in an amount of from about 10% to about 75%, all by weight of the grout composition. The grout composition may also include an alkaline earth metal oxide such as magnesium oxide present in an amount of from about 0% to about 2% and a dispersant-such as sodium acid pyrophosphate present in an amount of from about 2% to about 10%, both by weight of the grout composition.

In another embodiment, methods of installing a conduit in a hole in the earth include placing the conduit in the hole, forming a grout slurry having a thermal conductivity greater than about 1.4 Btu/hr-ft-° F., and placing the grout slurry in the hole adjacent to the conduit. The conduit is preferably a heat transfer loop for transferring heat between the earth and a heat transfer fluid flowing through the loop. The grout slurry exhibits a relatively high thermal conductivity, a relatively low hydraulic conductivity, and a relatively low viscosity when it is being pumped into the hole.

DETAILED DESCRIPTION OF THE PREFERRED EMBODIMENTS

Grout slurries having an improved thermal conductivity of greater than about 1.4 Btu/hr-ft-° F. may be employed to install a conduit in one or more holes in the earth. Their high thermal conductivities and relatively low hydraulic conductivities give them the ability to form very good thermally conductive seals around the conduit. As used herein, "conduit" refers to a material through which fluid or a current may flow, wherein the conduit may be hollow to allow the passage of fluid therethrough or solid to allow the flow of current therethrough. The conduit may be, for example, a heat transfer loop or a grounding rod. It is understood that the earth may be exposed or it may be covered by water such as sea or ocean water.

As will be described in more detail later, the grout slurries may be formed by combining a grout composition that is preferably a one-sack product with water. As used herein, "one-sack product" refers to a form of the grout composition in which its components are combined together in a single container such as a sack, allowing the grout composition to be easily transported to an on-site location where it will be used to form a grout slurry. The resulting grout slurries can be pumped into the hole in the earth and allowed to set in the space between the walls of the conduit and the earth. The solids content (i.e., the amount of the grout composition) in the grout slurries can be varied to achieve a desirable thermal conductivity therein and need not be very high to achieve desirable properties in the slurry. An exemplary grout slurry exhibits a relatively high thermal conductivity, a relatively low hydraulic conductivity after setting, and a relatively low pumping viscosity when the amount of the grout composition present in the grout slurry is in the range of from about 35% to about 45% by weight of the grout slurry.

Grout compositions that may be used to form such grout slurries contain components that enhance the various properties of the slurries. In an embodiment, grout compositions comprising sodium bentonite, calcium bentonite, a silica material, a carbon source, an alkaline earth metal oxide, and a dispersant may be used to install a conduit in a hole in the earth. The specific concentrations of the components in the grout compositions are as follows: calcium bentonite present in an amount of from about 15% to about 45%; sodium bentonite present in an amount of from about 15% to about 45%; a silica material present in an amount of from about 1% to about 35%; and a carbon source present in an amount of from about 10% to about 75%; optionally an alkaline earth metal oxide present in an amount of from about 0% to about 2%; and optionally a dispersant present in an amount of from about 2% to about 10%, all percentages (%'s) being by weight of the grout compositions.

Sodium bentonite is a water-swellable clay in which the principal exchangeable cation is a sodium ion. Its use in the grout compositions serves to enhance the viscosity of the grout slurries such that the solid particles contained therein can be transported to a desired location. The sodium bentonite also contributes to the low hydraulic conductivity of the grout slurries and thus enhances the ability of the slurries to form a good seal between the heat transfer loop and the earth. Examples of suitable sodium bentonite clays include Wyoming sodium bentonite, Western sodium bentonite, and combinations thereof. The sodium bentonite used in the grout compositions preferably has a 30-mesh grind size, but other grind sizes of the sodium bentonite may also be used. In alternative embodiments, the sodium bentonite may be supplemented by or substituted with other types of swellable clays known in the art such as hectorite.

Calcium bentonite is a clay in which the principal exchangeable cation is a calcium ion. It has a much slower hydration or swelling rate and degree of swelling than sodium bentonite and thus provides for improved control over the placement of the grout slurries. Various grind sizes of the calcium bentonite may be used, with a 200-mesh grind size being preferred.

The carbon source serves to improve the thermal conductivity of the grout slurries. Examples of suitable carbon sources include desulfurized petroleum coke, powdered carbon, flaked graphite, and combinations thereof, with flaked graphite being preferred. Desulfurized petroleum coke is described in U.S. Pat. No. 4,291,008, which is incorporated by reference herein in its entirety. Powdered carbon is an amorphous carbon having a particle size generally less than about 0.8 mm. Flaked graphite is a form of graphite present in gray cast iron that appears in the microstructure as an elongated, curved inclusion. Due to its relatively low resistivity and thin shape, it can become interlaced between the other types of particles in the grout slurries to form a conductive path in the slurries.

The silica material contributes to the good hydraulic conductivity and thermal conductivity exhibited by the grout slurries. The silica material is preferably silica flour, which is a finely ground silica generally having a particle size of less than or equal to about 40 microns. Examples of other suitable silica materials include condensed silica fume, rice hull ash, or combinations thereof. Condensed silica fume is a by-product of the manufacture of silicon or ferrosilicon, which involves subjecting quartz (when silicon is produced) or quartz and an iron-bearing material (when ferrosilicon is produced) to reduction with coke or coal and wood chips in a furnace. A gaseous suboxide of silicon forms, and a portion of the gaseous suboxide escapes into the atmosphere where it reacts with oxygen and condenses to form the glassy microscopic particles known as condensed silica fume. The particle size of condensed silica fume is generally smaller than about 1 micron. Rice hull ash is the by-product of burning rice hulls and has a particle size generally less than about 36 microns.

The alkaline earth metal oxide improves the set strength of the grout slurries and the hydraulic conductivity of the slurries. Various alkaline earth metal oxides can be employed in the grout compositions, including magnesium oxide, strontium oxide, or combinations thereof. The preferred alkaline earth metal oxide is magnesium oxide. In addition, various dispersants or thinners suitable for use with the other components in the grout compositions can be employed. Examples of suitable dispersants include ammonium lignosulfonate salt, metal lignosulfonate salts, phosphates, polyphosphates, organophosphates, phosphonates, tannins, leonardite, polyacrylates having a molecular weight less than about 10,000, and combinations thereof. A preferred dispersant is sodium acid pyrophosphate (SAPP). When the finer sodium bentonite grind sizes are used, the concentration of the SAPP used in conjunction with the sodium bentonite is near the upper limit of the previously mentioned SAPP concentration range.

The grout compositions may further include additional additives as deemed appropriate by one skilled in the art. Suitable additives would bring about desired results without adversely affecting other components in the grouting composition or the properties thereof.

In an embodiment, the grout compositions comprise calcium bentonite present in an amount of from about 15% to about 20%, sodium bentonite present in an amount of from about 15% to about 20%, a silica material present in an amount of from about 10% to about 20%, a carbon source present in an amount of from about 40% to about 50%, an alkaline earth metal oxide present in an amount of from about 0.5% to about 1%, a dispersant present in an amount of from about 4% to about 7%, all by weight of the grout compositions. In a preferred embodiment, the grout compositions comprise calcium bentonite present in an amount of about 17.5%, sodium bentonite present in an amount of about 17.5%, a silica material present in an amount of about 14.5%, a carbon source present in an amount of about 45%, an alkaline earth metal oxide present in an amount of about 0.5%, and a dispersant present in an amount of about 5%, all by weight of the grout compositions.

The grout compositions may be made by combining all of the components in any order and thoroughly mixing the components in a manner known to one skilled in the art. In a preferred embodiment, the grout compositions are manufactured off-site and then shipped as a one-sack product to the location where it is to be used to install an underground conduit.

Methods of installing a conduit in a hole in the earth comprise placing the conduit in the hole in the earth, mixing one of the foregoing grout compositions, which may be a one-sack product, with water to form a grout slurry, and placing the grout slurry in the hole adjacent to the conduit. The hole in the earth may be a borehole that has been drilled in the earth to a depth sufficient to hold the conduit therein. The grout slurry may be pumped into the space between the conduit and the walls of the hole until the space is filled with the slurry. After the placement of the grout slurry, it is allowed to set, thus forming a thermally conductive seal between the conduit and the earth. The water utilized in the grout slurry can be water from any source provided that it does not adversely affect the components or properties of the slurry and that it would not contaminate nearby soil. Preferably, fresh water in an amount sufficient to form a pumpable slurry is mixed with the grout composition. The water and the grout composition may be mixed to form the grout slurry using a standard mixing device such as a grouter or other similarly functioning device. The grout slurry preferably comprises from about 35% to about 45% of the grout composition by weight of the grout slurry and a balance of the water.

The set grout slurry seals the conduit within the hole in the earth and acts as a-heat transfer medium between the conduit and the earth. In one embodiment, the conduit may be a heat transfer loop through which a heat transfer fluid flows. Heat may be transferred between the earth and the heat transfer fluid via the set grout slurry and the walls of the heat transfer loop for the purpose of heating and/or cooling a space such as a building located above the surface of the earth. In another embodiment, the conduit may be a grounding rod used to protect structures such as television towers and radio antennas from lightning strikes. The grounding rod may extend from the top of such structure down to the set grout slurry, which has a relatively low resistivity. As such, if lightning strikes the grounding rod, the current created by the lightning may pass through the grounding rod and the set grout slurry to the ground.

After the grout slurry has set, it exhibits excellent properties that allow it to be used in the manner described above. The thermal conductivity, k, of the grout slurry varies depending on the particular concentration of the grout composition (i.e., the solids) in the slurry, with the thermal conductivity increasing as the grout composition increases. The grout slurry can be prepared inexpensively since the amount of the grout composition needed relative to the amount of water is relatively low. Further, less labor is required to prepare the grout slurry such that several holes in the earth can be filled more quickly. Based on measurements taken using a thermal conductivity meter made in-house at Halliburton Energy Services, Inc. (hereinafter a "Baroid thermal conductivity meter"), the grout slurry has a high thermal conductivity of, for example, greater than or equal to about 1.3 Btu/hr-ft-° F., greater than or equal to about 1.4 Btu/hr-ft-° F., greater than or equal to about 1.5 Btu/hr-ft-° F., or greater than or equal to about 1.6 Btu/hr-ft-° F. In addition, the grout slurry has a low hydraulic conductivity, K, of from about $5 \times 10^{-9}$ cm/s to about $1 \times 10^{-8}$ cm/s. While the thermal conductivity of the grout slurry indicates its ability to transfer heat, the hydraulic conductivity of the grout slurry indicates its resistance to fluids and thus measures its sealing ability. The lower the hydraulic conductivity of the set grout slurry, the better the seal it forms. As such, fluids are less likely to leak through the grout slurry from the surface into sub-surface ground water or wet soil. The grout slurry thus acts as a barrier to prevent contamination of such ground water or soil. Further, fluids such as oil, gas, and water in subterranean formations or zones are less likely to pass into other subterranean zones via the grout slurry. Details regarding the manner in which the thermal conductivity and the hydraulic conductivity can be determined are provided in the examples below.

The grout slurry also has a good working time, i.e., the time period between when it is prepared and when its viscosity is insufficient to allow it to be displaced into a space. For example, its working time may range from about 15 minutes to about 30 minutes. Furthermore, for a grout slurry comprising less than or equal to about 40% solids (i.e., grout composition) by weight of the slurry, the viscosity of the grout slurry is less than about 600 centipoise (cp) as measured using a FANN 35A rotational viscometer with a 5× torsion spring at 300 rpm. As such, the grout slurry can be pumped into the hole in the earth using, e.g., a grouter, without having to use relatively high pump pressures. The grout slurry also exhibits a good set strength, which is also referred to as the shear strength. For example, the set strength typically is greater than or equal about 2,000 lbs/100 ft² for a grout slurry comprising 35% solids, greater than or equal to about 3,000 lbs/100 ft² for a grout slurry comprising 40% solids, and greater than or equal to about 4,000 lbs/100 ft² for a grout slurry comprising 45% solids, all % solids being by weight of the grout slurry. In addition, the grout slurry experiences minimal or no subsidence after placement. Moreover, it is believed that the grout slurry is environmentally friendly such that there is no need to be concerned that it could, contaminate drinking water.

In an embodiment, the grout slurry may be placed in and allowed to set in a series of holes through which a continuous heat transfer loop, e.g., piping, has been run. The greater the number of holes, the more surface area of earth is exposed for heat transfer. Due to the higher thermal conductivity of the grout slurry described herein, less holes may be required to achieve the same amount of heat transfer as compared to using a conventional grout slurry. Therefore, the cost of a heat transfer system, which comprises holes in the earth and a heat transfer loop passing from a heat pump through the holes and back to the heat pump, may be lowered by using the grout slurry described herein to seal the holes.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

Three samples of a grout composition were prepared that contained 17.5% 30-mesh sodium bentonite, 17.5% 200-mesh calcium bentonite, 0.5% magnesium oxide, 5% sodium acid pyrophosphate, 14.5% silica flour, and 45% flaked graphite, all by weight of the grout composition. The three samples were added to different amounts of fresh water while blending over a 30-second period, followed by blending the resulting mixtures for an additional 90 seconds, thereby forming three grout slurries containing 35%, 40%, and 45% of the grout composition, respectively. This blending was performed using a LAB MASTER G3UO5R mixer commercially available from Lightnin® Mixer Co. The thermal conductivity of each grout slurry was measured using the Baroid thermal conductivity meter (TCM) in accordance with the following procedure. The communication box of the TCM was electrically coupled to a computer and to the thermal conductivity device of the TCM. Then 400 mL of the grout slurry was poured into the thermal conductivity device up to a level directly below a sensor at the top of the device. A cap was next placed on the thermal conductivity device, and the power of the communication box was turned on. The TCM program was then run on the computer. The heater of the TCM was turned on using the computer. Data collection began immediately after the heater was turned on. The TCM readings were allowed to stabilize, and such readings were taken for about 6 hours or more after stabilization had been achieved. The readings were then saved into an EXCEL spreadsheet upon test completion. The thermal conductivity measured for each grout slurry sample is shown in Table 1 below.

TABLE 1

| Amount of Grout Composition in the Grout Slurry, % by weight of the slurry | Thermal Conductivity, Btu/hr-ft-° F. |
|---|---|
| 35% | 1.1 |
| 40% | 1.3 |
| 45% | 1.6 |

Example 2

The hydraulic conductivity of a grout slurry sample (the IDP-357 slurry) made as described in this application and two control grout slurry samples (the IDP-232 slurry and the BAROTHERM slurry) were tested using the following procedure. Each grout slurry sample was prepared by adding the appropriate amount of the dry grout composition (188.5 grams for the 35% solids sample, 233.33 grams for the 40% solids sample, and 286.4 grams for the 45% solids sample) to 350 mL deionized water over a period of 30 seconds, followed by mixing the dry grout composition with the water for 1 minute after completing the addition of the dry grout composition. The LAB MASTER G3UO5R mixer set at 1,000 rpm was used for this mixing. The grout slurry was then immediately poured into a filter press cell containing ¼ inch of fine sand. The grout slurry was allowed to set for 4 hours, and then deionized water was poured on top of the set grout slurry. The filter press was subsequently sealed and allowed to set overnight. The filter press was then pressurized to 10 psi, and the filtrate was collected. The amount of filtrate collected was measured and used in the following formula to determine the hydraulic conductivity:

$$K = \left(\frac{5.08}{P*47.38}\right) * \left(\frac{Q}{t}\right)$$

where K=hydraulic conductivity in cm/s, Q=filtrate collected in mL, t=time interval in seconds, and P=pressure factor, which converts air pressure into an equivalent pressure exerted by a column of water. The thermal conductivity of each grout sample was also tested in the manner described in Example 1. Table 2 below gives the hydraulic conductivity and the thermal conductivity of each sample tested. The hydraulic conductivity values and the thermal conductivity values for two other controls are also provided in Table 2.

TABLE 2

| Grout Slurry & Amount of Solids in the Slurry, % by weight of the slurry | Hydraulic Conductivity, cm/s | Thermal Conductivity, Btu/hr-ft-° F. |
|---|---|---|
| IDP-232, 63.5% solids (control)[1] | $6.9 \times 10^{-6}$ | 0.977 |
| BAROTHERM, 70.4% solids (control)[2] | $6 \times 10^{-8}$ | 0.95 |
| THERMAL GROUT LITE, 65.1% solids (control)[3] | $<6.9 \times 10^{-8}$ | 1.0 |
| THERMAL GROUT SELECT, 70.4% solids (control)[3] | $<6.9 \times 10^{-8}$ | 1.2 |
| MIX 111 (control)[4] | $1 \times 10^{-16}$ | 1.4 |
| THERM-EX, 67% solids (control)[5] | $6 \times 10^{-8}$ | 1.05 |
| GEOTHERMAL GROUT, 68.3% solids (control)[6] | $5 \times 10^{-8}$ | 1.2 |
| IDP-357, 45% solids[7] | $5 \times 10^{-9}$ | 1.65 |

[1]The IDP-232 grout is described in U.S. Pat. No. 6,258,160, which is incorporated by reference herein. Its data is from testing conducted internally by the Industrial Drilling Products (IDP) laboratory.
[2]The BAROTHERM grout is commercially available from Halliburton Energy Services, Inc. Its data is from testing conducted internally by the Industrial Drilling Products (IDP) laboratory.
[3]The THERMAL GROUT LITE and SELECT grout are commercially available from GeoPro, Inc. Their data is from published literature by GeoPro, Inc.
[4]The formulation for the MIX 111 grout was made available to the public by the U.S. Department of Energy's Brookhaven National Laboratory. The MIX 111 grout is described in U.S. Pat. No. 6,251,179, which is incorporated by reference herein. Its data is taken from Brookhaven National Laboratory's web site located at www.bnl.gov/est/ghpfp.htm and entitled "Thermally Conductive Cementitious Grouts for Geothermal Heat Pumps."
[5]The THERM-EX grout is commercially available from WYO-BEN, Inc. Its data is from published literature by WYO-BEN, Inc.
[6]The GEOTHERMAL GROUT is commercially available from Colloid Environmental Technologies Co. (CETCO). Its data is from published literature by CETCO.
[7]The IDP-357 grout data is from testing conducted internally by the IDP laboratory.

Based on the results shown in Table 2, the grout slurry of the present application, i.e., the IDP-357 grout, exhibited a much higher thermal conductivity than the control grout slurries. Further, its hydraulic conductivity was lower than all of the control grout slurries except the MIX 111 grout slurry. As such, the grout slurry of the present application is recommended for use in installing a conduit such as a heat transfer loop in one or more holes in the earth.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of installing a conduit in a hole in the earth, comprising the steps of:
   (a) placing the conduit in at least one hole in the earth;
   (b) mixing a grout composition with water to form a grout slurry having a thermal conductivity great than about 1.4 Btu/hr-ft-° F., wherein the grout composition comprises calcium bentonite present in an amount of from about 15% to about 45%, sodium bentonite present in an amount of from about 15% to 45%, a silica material present in an amount of from about 10% to 35%, and a carbon source present in an amount of form about 10% to about 75%, all by weight of the grout composition; and
   (c) placing the grout slurry in the hole adjacent to the conduit.

2. The method of claim 1, wherein the grout composition is a one-sack product.

3. The method of claim 1, wherein the conduit comprises a heat transfer loop for transferring heat between the earth and a heat transfer fluid flowing through the loop.

4. The method of claim 1, wherein the conduit comprises a grounding rod.

5. The method of claim 1, wherein the sodium bentonite has a 30-mash particle size.

6. The method of claim 1, wherein the grout composition further comprises from about 0% a to about 2% of an alkaline earth metal oxide by weight of the grout composition.

7. The method of claim 6, wherein the alkaline earth metal oxide comprises magnesium oxide.

8. The method of claim 1, wherein the silica material comprises silica flour.

9. The method of claim 1, wherein the carbon source comprises flaked graphite.

10. The method of claim 1, wherein the grout composition comprises from about 2% to about 10% of a dispersant by weight of the grout composition.

11. The method of claim 10, wherein the dispersant comprises ammonium lignosulfonate salt, a metal lignosulfonate salt, a phosphate, a polyphosphate, an organophosphate, a phosphonate, a tannin, leonardite, a polyacrylate having a molecular weight greater than about 10,000, or combinations thereof.

12. The method of claim 10, wherein the dispersant comprises sodium acid pyrophosphate.

13. The method of claim 1, wherein an amount of the grout composition present in the grout slurry is in a range of from about 35% to about 45% by weight of the grout slurry.

14. The method of claim 1, wherein the grout slurry has a thermal conductivity greater than about 1.5 Btu/hr-ft-° F.

15. The method of claim 1, wherein the grout slurry has a thermal conductivity greater than about 1.6 Bt/hr-ft-° F.

16. The method of claim 1, wherein the grout slurry has a hydraulic conductivity of from about $5\times10^{-9}$ cm/s to about $1\times10^{-8}$ cm/s.

17. The method of claim 1, wherein the grout composition comprises calcium bentonite present in an amount of from about 15% to about 20%, sodium bentonite present in an amount of firm about 15% to about 20%, a silica material present in an amount of from about 10% to about 20%, a carbon source present in an amount of from about 40% to about 50%, an alkaline earth metal oxide present in an amount of from about 0.5% to about 1%, a dispersant present in an amount of from about 4% to about 7%, all by weight of the grout composition.

18. The method of claim 1, wherein the grout slurry has a viscosity of less than about 600 cp when an amount of the grout composition present in the grout sluny is less than or equal to about 40% by weight of the grout slurry.

19. The method of claim 1, wherein the grout composition comprises calcium bentonite present in an amount of about 17.5%, sodium bentonite present in an amount of about 17.5%, silica material is present in an amount of about 14.5%, a carbon source is present in an amount of about 45%, an alkaline earth metal oxide present in an amount of about 0.5%, and a dispersant present in an amount of about 5%, all by weight of the grout composition.

20. A grout composition comprising:
   (a) sodium bentonite present in an amount of from about 15% to about 45% by weight of the grout composition;
   (b) calcium bentonite present in an amount of from about 15% to about 45% by weight of the grout composition;
   (c) a silica material present in an amount of from about 10% to about 35% by weight of the grout composition;
   (d) a carbon source present in an amount of from about 10% to about 75% by weight of the grout composition; and
   (e) a dispersant present in an amount of from about 2% to about 10% by weight of the grout composition.

21. The grout composition of claim 20, being a one-sack product.

22. The grout composition of claim 20, wherein the sodium bentonite has a 30-mesh particle size.

23. The grout composition of claim 20, further comprising an alkaline earth metal oxide present in an amount of from about 0% to about 2% by weight of the grout composition.

24. The grout composition of claim 23, wherein the alkaline earth metal oxide comprises magnesium oxide.

25. The grout composition of claim 20, wherein the silica material comprises silica flour.

26. The grout composition of claim 20, wherein the carbon source comprises flaked graphite.

27. The grout composition of claim 20, wherein the dispersant comprises an ammonium lignosulfonate salt, a metal lignosulfonate salt, a phosphate, a polyphosphate, an organophosphate, a phosphonate, a tannin, a leonardite, a polyacrylate, or combinations thereof.

28. The grout composition of claim 20, wherein the dispersant comprises sodium acid pyrophosphate.

29. The grout composition of claim 20, further comprising water to form a grout slurry having a thermal conductivity greater than or equal to about 1.3 Btu/hr-ft-° F.

30. The grout composition of claim 20, further comprising water to form a grout slurry having a thermal conductivity greater than or equal to about 1.4 Btu/hr-ft-° F.

31. The grout composition of claim 20, further comprising water to form a grout slurry having a thermal conductivity greater than or equal to about 1.5 Btu/hr-ft-° F.

32. The grout composition of claim 20, further comprising water to form a grout slurry having a thermal conductivity greater than or equal to about 1.6 Btu/hr-ft-° F.

33. The grout composition of claim 20, further comprising water to form a grout slurry having a hydraulic conductivity of from about $5\times10^{-9}$ cm/s to about $1\times10^{-8}$ cm/s upon setting.

34. The grout composition of claim 20, further comprising an alkaline earth metal oxide present in an amount of from about 0.5% to about 1%, wherein the calcium bentonite is present in an amount of from about 15% to about 20%, the sodium bentonite is present in an amount of from about 15% to about 20%, the silica material is present in an amount of from about 10% to about 20%, the dispersant is present in an amount of from about 4% to about 7%, and the carbon source is present in an amount of from about 40% to about 50%, all by weight of the grout composition.

35. The grout composition of claim 20, further comprising water to form a grout slurry having a viscosity of less than about 600 cp when an amount of the grout composition present in the grout slurry is less than or equal to about 40% by weight of the grout slurry.

36. The grout composition of claim 20, being present in a grout slurry in an amount of from about 35% to about 45% by weight of the grout slurry.

37. The grout composition of claim 20, further comprising an alkaline earth metal oxide present in an amount of about 0.5%, wherein the calcium bentonite is present in an amount of about 17.5%, the sodium bentonite is present in an amount of about 17.50%, the silica material is present in an amount of about 14.5%, the dispersant is present in an amount of about 5%, and the carbon source is present in an amount of about 45%, all by weight of the grout composition.

38. A grout slurry having a thermal conductivity greater than about 1.4 Btu/hr-ft-° F., wherein the grout slurry comprises water and a grout composition comprises calcium bentonite present in an amount of from about 15% to about 45%, sodium bentonite present in an amount of from about 15% to about 45%, a silica material present in an amount of from about 10% to about 35%, a carbon source present in an amount of from about 10% to about 75%, an alkaline earth metal oxide present in an amount of from about 0% to about 2%, a dispersant present in an amount of from about 2% to about 10%, all by weight of the grout composition.

39. The grout slurry of claim 38, wherein the thermal conductivity is greater than about 1.5 Btu-hr-ft-° F.

40. The grout slurry of claim 38, wherein the thermal conductivity is greater than about 1.6 Btu/hr-ft-° F.

41. The grout slurry of claim 38, having a hydraulic conductivity of from about $5 \times 10^{-9}$ cm/s to about $1 \times 10_{-8}$ cm/s.

42. The grout slurry of claim 38, comprising water and a grout composition present in an amount of form 35% to about 45% by weight of the grout slurry.

43. The grout slurry of claim 38, comprising water and a grout composition wherein the grout composition in one-sack product.

* * * * *